(12) United States Patent
Hanson

(10) Patent No.: US 11,214,691 B2
(45) Date of Patent: Jan. 4, 2022

(54) BETAINE POLYMER COATINGS PREPARED BY LIVING POLYMERIZATION

(71) Applicant: Aculon, Inc., San Diego, CA (US)

(72) Inventor: Eric L. Hanson, Carlsbad, CA (US)

(73) Assignee: ACULON, INC, San Diego, CA (US)

( * ) Notice: Subject to any disclaimer, the term of this patent is extended or adjusted under 35 U.S.C. 154(b) by 430 days.

(21) Appl. No.: 13/815,819

(22) Filed: Mar. 15, 2013

(65) Prior Publication Data

US 2014/0272428 A1 Sep. 18, 2014

(51) Int. Cl.
*C09D 133/14* (2006.01)
*C09D 4/00* (2006.01)
*C08F 220/38* (2006.01)

(52) U.S. Cl.
CPC ............ *C09D 4/00* (2013.01); *C08F 220/387* (2020.02); *Y10T 428/31649* (2015.04); *Y10T 428/31678* (2015.04); *Y10T 428/31699* (2015.04); *Y10T 428/31935* (2015.04)

(58) Field of Classification Search
CPC ................................................ C08F 2220/387
See application file for complete search history.

(56) References Cited

U.S. PATENT DOCUMENTS

| | | | |
|---|---|---|---|
| 3,671,502 A | 6/1972 | Samour et al. ...... | 260/79.3 MU |
| 5,153,289 A | 10/1992 | Schulz et al. ................ | 526/264 |
| 6,946,164 B2 | 9/2005 | Huang ......................... | 427/387 |
| 7,879,444 B2 | 2/2011 | Jiang et al. ................ | 428/411.1 |
| 7,910,660 B2 | 3/2011 | Millward et al. ............ | 525/267 |
| 7,943,370 B2 | 5/2011 | Minami et al. ............ | 435/287.2 |
| 8,025,974 B2 | 9/2011 | Hanson et al. ............... | 428/421 |
| 2008/0139689 A1 | 6/2008 | Huang et al. ................... | 522/67 |
| 2010/0168318 A1 | 7/2010 | Severac et al. ............... | 524/544 |
| 2010/0181659 A1 | 7/2010 | Hanson et al. ............... | 257/676 |

OTHER PUBLICATIONS

"Atom-Transfer Radical Grafting Polymerization of 2-Methacryloyloxyethyl Phosphorylcholine from Silicon Wafer Surfaces," 2004, Journal of Polymer Science A, vol. 42, issue, 12, 2931-2942.*
"Molecular Recognition at the Exterior Surface of a Zwitterionic Telomer Brush," Kitano et al., Langmuir, 2010, 26, 6767-6774.*
"Bisphosphonate Adaptors for Specific Protein Binding on Zirconium Phosphonate-based Microarrays," Cinier et al., Bioconjugate Chemistry, 2009, 20, 2270-2277.*
Xiangxing Kong et al., "Amphiphilic Polymer Brushes Grown from the Silicon Surface by Atom Transfer Radical Polymerization", *Macromolecules*, vol. 34, No. 6, 2001, pages 1837-1844, 2001 American Chemical Society, publlshed on Web Feb. 10, 2001.
Isabelle Minet et al., "Surface-Initiated ATRP of PMMA, PS and diblock PS-b-PMMA copolymers from stainless steel modified by 11-(2-bromoisobutyrate)-undecyl-1-phosphonic acid", *Journal of Colloid and Interface Science* 332 (2009), 317-326.

* cited by examiner

*Primary Examiner* — Ian A Rummel
(74) *Attorney, Agent, or Firm* — Blynn L. Shideler; Krisanne Shideler; BLK Law Group

(57) ABSTRACT

A betaine-containing polymer film that can be formed on a substrate surface using living polymerization such as controlled radical polymerization is disclosed.

28 Claims, No Drawings

BETAINE POLYMER COATINGS PREPARED BY LIVING POLYMERIZATION

FIELD OF THE INVENTION

The present invention relates to self-assembled monolayers (SAMs), and more particularly SAMs containing a betaine polymer segment, and to a process using living polymerization such as controlled radical polymerization, particularly atom transfer radical polymerization (ATRP), to form such SAMs on the surface of a substrate.

BACKGROUND OF THE INVENTION

Betaine-containing polymeric coatings are interesting because of their hydrophilic properties and antifouling properties. Such polymers can be used on medical devices to improve biocompatibility between living tissue and the medical device. Another important property of the hydrophilic coating is to reduce friction resulting in the biomedical device becoming slippery when wet. Such medical devices where hydrophilic coatings are desirable include catheters, guidewires, endoscopes, contact lenses and implants.

For certain applications, coating thickness and adhesion of the hydrophilic coating to the substrate are critical. The coating must be thin, that is, less than 1000 nanometers, and adhere well to the substrate.

SUMMARY OF THE INVENTION

The present invention provides a self-assembled monolayer (SAM) derived from an organophosphorus acid containing a betaine polymer segment and to a process for preparing the SAM.

In another aspect, the invention provides a substrate having at least two major planar surfaces and having adhered, directly or indirectly through an organometallic coating, to at least one of the major surfaces a SAM of an organophosphorus acid containing one or more organo groups and a phosphorus acid group in which the phosphorus acid groups are adsorbed on the substrate surface and the organo groups extend outwardly from the substrate surface and at least one of the organo groups is substituted with a betaine polymer segment.

The present invention also provides a process for forming a self-assembled monolayer (SAM) of a betaine-containing polymer film on a substrate surface. The SAM is formed by contacting the surface of the substrate with an organophosphorus acid. The organo portion of the organophosphorus acid contains an initiator moiety for living polymerization such as controlled radical polymerization such as a halide group. The SAM is then contacted with a betaine-containing monomer component and polymerization is conducted under living polymerization such as controlled radical polymerization conditions, such as by ATRP, to form a thin coating of a betaine-containing polymer on the surface of the substrate. The phosphorus acid groups are adsorbed on the substrate surface and the coating is of molecular dimensions. Living polymerization such as controlled radical polymerization of the betaine-containing monomer component results in covalent bonding of the betaine polymer segment to the SAM insuring for good adhesion and minimal thickness.

In a specific aspect, the invention provides a process for forming a betaine-containing polymer film on a substrate surface comprising:

(a) contacting the substrate surface with a compound containing in a terminal portion a phosphorus acid group, and in a second terminal portion, an initiator for living polymerization such as controlled radical polymerization, (b) forming a self-assembled monolayer (SAM) from the compound with the phosphonic acid group being reactive with the substrate surface to bond the compound to the substrate surface and with the initiator extending outwardly from the substrate surface, (c) contacting the SAM with a monomer component comprising at least in part a betaine-containing monomer and a living polymerization such as a controlled radical polymerization catalyst, and (d) polymerizing the monomer component with the initiator to form a layer of betaine-containing polymer on the substrate surface.

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

The term "polymer" is also meant to include copolymer and oligomer.

The term "(meth)acryl" refers to both methacryl and acryl compounds such as methyl methacrylate and methyl acrylate.

The term "acid" is meant to include substances that donate a proton in a cnemical reaction to a base. The term "acid derivative" is meant to include materials that behave similarly to acids such as acid salts, and acid esters, particularly lower alkyl esters containing from 1 to 4 carbon atoms.

DETAILED DESCRIPTION

The process according to the present invention utilizes living polymerization such as controlled radical polymerization, particularly atom transfer radical polymerization (ATRP), and the invention will be described in terms of ATRP.

In accordance with the process of the present invention, the surface of the substrate is first contacted with initiator molecules to form a SAM of an initiator. The initiator-coated substrate is then contacted with a betaine-containing monomer component and an ATRP catalyst and polymerized under ATRP conditions to form a layer or film of betaine-containing polymer.

The substrate onto which the films of the present invention can be formed include any substrate in which the phosphorus acid groups can be adsorbed on the substrate surface. Examples of such substrates include, but are not limited to, glass, metal oxide, silicon, quartz and polymeric substrates. The substrate may take any desired size or shape such as a square, round, flat chip or a sphere.

The surface of the substrate typically contains reactive functional groups such as, for example, hydroxyl groups, thiol groups, metal oxide groups or mixtures thereof that are capable of bonding such as covalently bonding with the phosphorus acid groups. The density of these functional groups is a function of the type of the substrate being used as well as any steps of preparation that involve exposing the surface of the substrate to the SAM-forming materials. Functional groups may also be introduced onto the surface of the substrate by being exposed to chemicals, chemical discharge, plasma treatment, etc. For example, a piranha solution can be used to hydroxylate the surface of a silicon substrate. Such substrates, such as metals, have groups, i.e., metal oxide, available on their surface that are intrinsic to the substrate.

The organophosphorus acid that is used to form the SAM can be an organophosphoric acid, an organophosphonic acid or an organophosphinic acid. Typical organophosphorus acids are those of the structure:

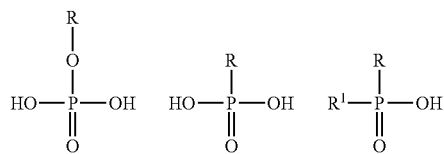

where R and $R^1$ are independently organic radicals that are aliphatic, aromatic or mixed aliphatic/aromatic; R and/or $R^1$ is substituted in the terminal position with an initiator for ATRP, typically a halide moiety such as bromide or chloride.

Specific examples of organophosphorus acids are those of the structure:

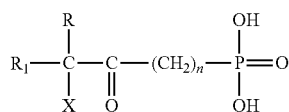

where n is an integer of 1 to 5; $R_1$ is an alkyl group of 1 to 20 carbon atoms; $R_2$ is hydrogen or alkyl of 1 to 20 carbon atoms and X is bromide or chloride. A specific example of such a compound is 11-(2-bromo-2-methylpropionyloxy)undecyl-1-phosphonic acid.

For application to the substrate, the organophosphorus acid is dissolved in a liquid diluent, however it can also be applied via vacuum evaporation. The concentration is typically dilute, for example, no greater than 10 percent on a weight/volume basis, and preferably is within the range of 0.01 to 1.0 percent. The percentages are based on total weight or volume of the solution.

Examples of diluents are water or hydrocarbons such as hexane, isooctane and toluene; ketones such as methyl ethyl ketone; alcohols such as methanol, ethanol and isopropanol; and ethers such as tetrahydrofuran.

The solution of the organophosphorus acid can be applied to the surface of the substrate by dipping, rolling, spraying, printing, stamping, or wiping. After application of the organophosphorus acid, the diluent is permitted to evaporate, with or without wiping during evaporation, preferably at ambient temperature, or optionally by the application of heat.

The resultant layer is typically thin, having a thickness of about 100 nanometers or less, such as 0.5 to 100 nanometers. It is preferable (but not required) that the layer is rinsed with fresh solvent, such as acetone or ethanol before being exposed to the polymerization mixture, as excess initiator will dissolve into the layer and cause undesirable bulk polymer formation in solution.

The organophosphorus acid forms a SAM on the surface of the substrate. The self-assembled layer is formed by the adsorption and spontaneous organization of the organophosphorus acid on the surface of the substrate. The organophosphorus acids are amphiphilic molecules that have two functional groups. The first functional group, i.e., the head functional group, is an acid group that adsorbs on the substrate surface and can bond thereto such as by Van Der Walls attraction or by covalently bonding to the substrate surface through reaction with cofunctional groups such as oxide and/or hydroxyl groups. The second functional group, i.e., the tail, the organo groups containing the initiator groups in the terminal position extend outwardly from the surface of the substrate. It is believed that in this configuration the monolayer, although very thin, is very effective in promoting adhesion to the substrate.

The organophosphorus acid can be applied directly to the substrate or can be applied indirectly to the substrate through an intermediate organometallic coating or layer. When better adhesion and durability is desired, an organometallic coating may be applied to the substrate, followed by application of the organophosphorus acid.

The organometallic compound is preferably derived from a metal or metalloid, preferably a transition metal, selected from Group III and Groups IIIB, IVB, VB and VIB of the Periodic Table. Transition metals are preferred, such as those selected from Groups IIIB, IVB, VB and VIB of the Periodic Table. Examples are tantalum, titanium, zirconium, lanthanum, hafnium and tungsten. The organo portion of the organometallic compound is selected from those groups that are reactive with functional groups, such as acid groups (or their derivatives) of the organophosphorus acid. Also, as will be described later, the organo group of the organometallic compound is believed to be reactive with groups on the substrate surfaces being treated such as oxide and hydroxyl groups. Examples of suitable organo groups of the organometallic compound are alkoxide groups containing from 1 to 18, preferably 2 to 4 carbon atoms, such as ethoxide, propoxide, isopropoxide, butoxide, isobutoxide, tert-butoxide and ethylhexyloxide. Mixed groups such as alkoxide, acetyl acetonate and chloride groups can be used.

The organometallic compounds can be in the form of simple alkoxylates or polymeric forms of the alkoxylate, and various chelates and complexes. For example, in the case of titanium and zirconium, the organometallic compound can include:

a. alkoxylates of titanium and zirconium having the general formula $M(OR)_4$, wherein M is selected from Ti and Zr and R is $C_{1-18}$ alkyl, b. polymeric alkyl titanates and zirconates obtainable by condensation of the alkoxylates of (a), i.e., partially hydrolyzed alkoxylates of the general formula $RO[-M(OR)_2O-]_{x-1}R$, wherein M and R are as above and x is a positive integer, c. titanium chelates, derived from ortho titanic acid and polyfunctional alcohols containing one or more additional hydroxyl, halo, keto, carboxyl or amino groups capable of donating electrons to titanium. Examples of these chelates are those having the general formula

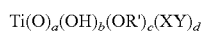
$$Ti(O)_a(OH)_b(OR')_c(XY)_d$$

wherein a=4−b−c−d; b=4−a−c−d; c=4−a−b−d; d=4−a−b−c; R' is H, R as above or X—Y, wherein X is an electron donating group such as oxygen or nitrogen and Y is an aliphatic radical having a two or three carbon atom chain such as i. —$CH_2CH_2$—, e.g., of ethanolamine, diethanolamine and triethanolamine,

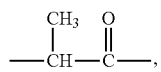

ii. e.g., of lactic acid,

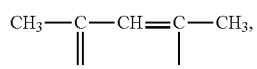

iii. e. g., of acetylacetone enol form, and

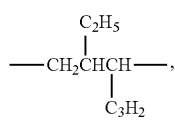

iv. e.g., as in 1,3-octyleneglycol, d. titanium acylates having the general formula $Ti(OCOR)_{4-n}(OR)_n$ wherein R is $C_{1-18}$ alkyl as above and n is an integer of from 1 to 3, and polymeric forms thereof, e. mixtures thereof.

The organometallic compound is usually dissolved or dispersed in a diluent. Examples of suitable diluents are alcohols such as methanol, ethanol and propanol, aliphatic hydrocarbons, such as hexane, isooctane and decane, ethers, for example, tetrahydrofuran and dialkyl ethers such as diethyl ether. Alternatively, the organometallic compound can be applied by vapor deposition techniques.

Also, adjuvant materials may be present with the organometallic compound and the diluent (organometallic compositions). Examples include stabilizers such as sterically hindered alcohols, surfactants and anti-static agents. The adjuvants if present are present in amounts of up to 30 percent by weight based on the non-volatile content of the composition.

The concentration of the organometallic compound in the composition is not particularly critical but is usually at least 0.01 millimolar, typically from 0.01 to 100 millimolar, and more typically from 0.1 to 50 millimolar.

The organometallic treating composition can be obtained by mixing all of the components at the same time or by combining the ingredients in several steps. Since in some cases, the organometallic compound is reactive with moisture, care should be taken that moisture is not introduced with the diluent or adjuvant materials and that mixing is conducted in a substantially anhydrous atmosphere.

The organometallic composition can be applied to the substrate surface by conventional means such as immersion coating such as dipping, rolling, spraying or wiping to form a film. The diluent is permitted to evaporate. This can be accomplished by heating to 50-200° C. or by simple exposure to ambient temperature, that is, from 20-25° C. It is believed that the resulting film is in the form of a polymeric metal oxide in multilayer form with unreacted alkoxide and hydroxyl groups. This is accomplished by depositing the film under conditions resulting in hydrolysis and self-condensation of the alkoxide. These reactions result in a polymeric coating being formed that provides cohesive strength to the film. The conditions necessary for these reactions to occur is to deposit the film in the presence of water, such as a moisture-containing atmosphere, however, these reactions can be performed in solution by the careful addition of water. The resulting film has some unreacted alkoxide groups and/or hydroxyl groups for subsequent reaction and covalent bonding with the organophosphorus over layer material. However, for readily co-reactive groups, ambient temperatures, that is, 20° C., may be sufficient. Although not intending to be bound by any theory, it is believed the polymeric metal oxide is of the structure:

$$[M(O)_x(OH)_y(OR)_z]_n$$

where M is the metal of the invention; R is an alkyl group containing from 1 to 30 carbon atoms; x+y+z=V, the valence of M; x is at least 1; y is at least 1; z is at least 1; x=V−y−z; y=V−x−z; z=V−x−y; n is greater than 2, such as 2 to 1000. Optionally, the organometallic film may also contain chloride ligands.

The resulting film typically has a thickness of 0.5 to 100 nanometers. For other applications, thicker films can be used. When the organometallic compound is used neat and applied by chemical vapor deposition techniques in the absence of moisture, a thin metal alkoxide film is believed to form. Polymerization, if any occurs, is minimized and the film may be in monolayer configuration. When the organometallic compound is subjected to hydrolysis and self-condensation conditions as mentioned above, thicker films are formed.

Although not intending to be bound by any theory, it is believed the functional groups such as the acid of the organophosphorus compound covalently bond with the hydroxyl or alkoxide group of the organometallic coating, resulting in a durable film. It is believed that the organophosphorus acids form a self-assembled layer that may be at least in part a monolayer on the surface of the substrate as generally described above.

Prior to application of the organophosphorus acid and/or the organometallic compound, the substrate is cleaned such as by a degreasing step particularly if the substrates have been in an environment where they have accumulated hydrocarbon films. A dip with an alcoholic solvent such as isopropyl alcohol may be used.

The SAM as described above is contacted with a radically polymerizable betaine-containing monomer component that also contains an ATRP catalyst, at least one ligand and a reducing agent, all dissolved in a suitable diluent. Examples of betaine-containing monomers are carbobetaines and sulfobetaines. These monomers typically have the following structure:

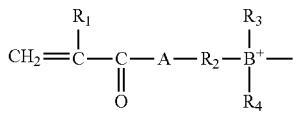

such as

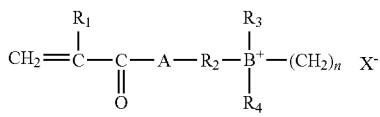

where $R_1$ is hydrogen or methyl; A is oxygen or —NH—; $R_2$ is ethylene or propylene; $R_3$ and $R_4$ are alkyl typically containing from 1 to 4 carbon atoms; B is N or P; n is an integer of 1 to 4; and $X^-$ is $SO_3^-$ or $CO_2^-$. Examples of such monomers are [2-(methacryloyloxy)ethyl]dimethyl-(3 sulfopropyl)ammonium hydroxide and [2-(methacryloyloxy)ethyl]dimethyl-(2 carboxyethyl)ammonium hydroxide.

Besides the betaine-containing monomer, the radically polymerizable component may optionally contain a different radically polymerizable monomer or mixture of monomers. Examples include olefins such as ethylene and propylene; (meth)acrylol monomers such as (meth)acrylic acid and esters thereof such as methyl (meth)acrylate and ethyl (meth)acrylate; substituted esters thereof such as hydroxypropyl(meth)acrylate and hydroxyethyl(meth)acrylate and vinyl aromatic compounds such as styrene and vinyl toluene.

Typically, the betaine-containing monomer is present in the radically polymerizable monomer component in amounts of 10 to 100, usually 50 to 100 percent by weight; the percentages by weight being based on total monomer weight. The radically polymerizable monomer component is used in combination with an ATRP polymerization catalyst, typically a transition metal compound, which participates in a reversible redox cycle with the initiator; and a ligand, which coordinates with the transition metal compound. The ATRP process is described in further detail in International Patent Publication No. WO 98/40415 and U.S. Pat. Nos. 5,807,937, 5,763,548 and 5,789,487.

Catalysts that may be used in the ATRP preparation include any transition metal compound. It is preferred that the transition metal compound not form direct carbon-metal bonds with the polymer chain. Transition metal catalysts useful in the present invention may be represented by the following general formula:

$$M^{n+}X_n$$

wherein M is the transition metal, n is the formal charge on the transition metal having a value of from 0 to 7, and X is a counterion or covalently bonded component. Examples of the transition metal M include, but are not limited to, Cu, Fe, Au, Ag, Hg, Pd, Pt, Co, Mn, Ru, Mo, Nb and Zn. Examples of X include, but are not limited to, halide, hydroxy, oxygen, $C_1$-$C_6$ alkoxy, cyano, cyanato, thiocyanato and azido. A preferred transition metal is Cu(I) and X is preferably halide, e.g., chloride. Accordingly, a preferred class of transition metal catalyst is the copper halides, e.g., Cu(I)Cl. It is also preferred that the transition metal catalyst contain a small amount, e.g., 1 mole percent, of a redox conjugate, for example, Cu(II)Cl$_2$, when Cu(I)Cl is used. Additional catalyst useful in preparing the pigment dispersant are described in U.S. Pat. No. 5,807,937 at column 18, lines 29 through 56. Redox conjugates are described in further detail in U.S. Pat. No. 5,807,937 at column 11, line 1 through column 13, line 38.

Ligands that may be used in ATRP for preparation of the polymerization catalyst include, but are not limited to, compounds having one or more nitrogen, oxygen, phosphorus and/or sulfur atoms, which can coordinate to the transition metal catalyst compound, e.g., through sigma and/or pi bonds. Classes of useful ligands include, but are not limited to, tertiary aliphatic amines, unsubstituted and substituted pyridines and bipyridines; porphyrins; cryptands; crown ethers; e.g., 18-crown-6; polyamines, e.g., ethylenediamine; glycols, e.g., alkylene glycols, such as ethylene glycol; carbon monoxide; and coordinating monomers, e.g., styrene, acrylonitrile and hydroxyalkyl(meth)acrylates. As used herein and in the claims, the term "(meth)acrylate" and similar terms refer to acrylates, methacrylates and mixtures of acrylates and methacrylates. A preferred class of ligands are the substituted bipyridines, e.g., 4,4'-dialkyl-bipyridyls. Additional ligands that may be used in preparing pigment dispersant are described in U.S. Pat. No. 5,807,937 at column 18, line 57 through column 21, line 43.

The reducing agent may be any reducing agent capable of reducing the transition metal catalyst from a higher oxidation state to a lower oxidation state, thereby reforming the catalyst activator state. Such reducing agents include, but are not limited to, $SO_2$, sulfites, bisulfites, thiosulfites, mercaptans, hydroxylamines, hydrazine ($N_2H_4$), phenylhydrazine (Ph-NHNH$_2$), hydrazones, hydroquinone, food preservatives, flavonoids, beta carotene, vitamin A, α-tocopherols, vitamin E, propyl gallate, octyl gallate, BHA, BHT, propionic acids, ascorbic acid, sorbates, reducing sugars, sugars comprising an aldehyde group glucose, lactose, fructose, dextrose, potassium tartrate, nitriles, nitrites, dextrin, aldehydes, glycine, and transition metal salts.

The above-mentioned ingredients are typically dissolved in a diluent such as an organic solvent, for example, acetone or methanol. Also solvents such as those containing oligo ethylene oxide and propylene oxide groups, such as diethylene glycol, diethylene glycol monomethyl ether and tripropylene glycol monomethyl ether may be used. Such solvents often boost the activity of the catalyst. The concentration of the radically polymerizable monomer is typically from 5 to 70 percent by weight based on total weight of solution. The molar ratio of catalyst to monomer ranges from 1:5 to 1:500, such as 1:20 to 1:100; the molar ratio of ligand to catalyst ranges from 1:2 to 1:100, such as 1:2 to 1:5. The molar ratio of reducing agent to catalyst is from 1:0.1 to 10 such as 1:0.5 to 2.

The solution of the radically polymerizable monomer component can be applied to the initiator-coated substrate by conventional means such as dipping, rolling, spraying, printing, stamping or wiping. The formation of the ATRP film or coating can occur at temperatures in the range of 25-150° C. and at pressures of 1-100 atmospheres, usually at ambient temperature and pressure. The time for conducting the ATRP can vary depending on the thickness of the film desired. Films of less than 1000 nanometers, usually from 100-500 nanometers, are useful for most applications. The thickness of the film can be monitored by Quartz Crystal Microgravometric (QCM) measurement and the time for the ATRP is typically from 30 to 600 minutes. After ATRP, the coated substrate is removed from any remaining solution by rinsing with a polar solvent and drying the coated substrate.

When the surface of the initiator-coated substrate is exposed to the solution of the radically polymerizable monomer component and subjected to ATRP conditions, the monomers contained therein form covalent bonds with each other and with the initiator groups that are bonded to the surface of the substrate. As mentioned above, the resultant coating or film is relatively thin with strong adhesion to the substrate. The resulting polymer has a low polydispersity index because chain transfer reactions are minimized. Lower polydispersity indices enable the molecular weight of the polymer to be controlled and optimized for the particular application intended.

The resultant coatings are hydrophilic making them useful for easy clean coatings, antifog coatings and mold release agents. The coatings are also antifouling and can be useful in applications such as coatings for ship hulls, implanted biomaterials, medical instruments and drug delivery apparatus.

EXAMPLES

The following example shows the preparation of a coating prepared via ATRP of sulfobetaine monomer on a SAM of an initiator-coated borosilicate glass slide. All parts are by weight unless otherwise indicated.

The materials used in the Example were as follows:

Organometallic solution: 0.025% by weight of tantalum ethoxide in isopropanol and 0.0025% by weight anhydrous hydrochloric acid in isopropanol.

Organophosphorus acid: 1 micromole of 11-(2-bromoisobutyrol) undecyl phosphonic acid in toluene.

Sulfobetaine monomer: [2-(methacryloyloxy)ethyl]dimethyl-(3-sulfopropyl) ammonium hydroxide.

Catalyst: Copper (I) Bromide.

Ligand: N,N,N,N,N pentamethyldiethylene triamine (PMDETA).

Reducing agent: sodium ascorbate.

Borosilicate glass slides (2.5×7.5 cm) were cleaned by immersion in a heated solution (60-70° C.) of 1% Alconox powdered precision cleaner in distilled water, rinsed under running water then dried with clean compressed air.

After cleaning, the substrate was dipped in the organometallic solution for 10 seconds and slowly removed (about 4 cm/minute) from the solution and allowed to air dry vertically. The panels were then heated at 60° C. for 5 minutes. The panels were then dipped in the organophosphorus acid solution for 5 minutes, removed and immediately rinsed with toluene. The coated panels were blown dry and then heated at 60° C. for 5 minutes.

A polymerization solution was prepared by first preparing a 1 molar solution of the sulfobetaine monomer in 20 mL of water. The solution was degassed with a nitrogen needle for 15 minutes. 40 mg of catalyst was added to 1 mole/liter of the sulfobetaine monomer solution followed by the addition of 0.26 milliliters of PMDETA and 10 mg of the reducing agent.

The coated slides were placed in a sealed glass polymerization chamber, and the chamber purged with a nitrogen-free gas. The polymer solution was then continuously injected via a syringe pump into the chamber (excess flowing into a waste container) at ambient conditions of temperature and pressure and the thickness of the forming film was monitored by QCM. The reaction was terminated by injecting clean distilled water through the polymerization cell when the thickness of the film was about 50 nanometers. The time of film formation was 240 minutes.

The invention is now set forth in the following claims.

The invention claimed is:

1. A self-assembled monolayer (SAM) derived from an organophosphorus acid and containing a betaine polymer segment, wherein at least one organo group of the organophosphorus acid is substituted with the betaine polymer segment, and wherein the betaine polymer segment is derived from a betaine-containing monomer of the structure:

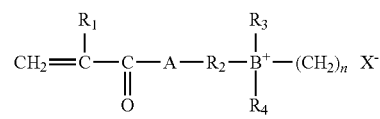

where $R_1$ is hydrogen or methyl; A is oxygen or —NH—; $R_2$ is ethylene or propylene; $R_3$ and $R_4$ are alkyl; B is N or P; n is an integer of 1 to 4; and $X^-$ is $SO_3$ or $CO_2^-$.

2. The SAM of claim 1 in which the organophosphorus acid is selected from the group consisting of organophosphoric acids, organophosphonic acids and organophosphinic acids.

3. The SAM of claim 1 in which the organophosphorus acid is of one of the structure:

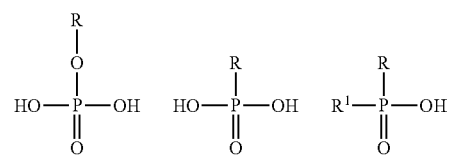

where R and $R^1$ are independently organic radicals that are aliphatic, aromatic or mixed aliphatic/aromatic; R and/or $R^1$ is substituted in a terminal position with the betaine polymer segment.

4. The SAM of claim 1 in which the organophosphorus acid is of the structure:

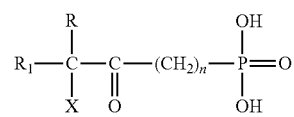

where n is an integer of 1 to 5; $R_1$ is an alkyl group of 1 to 20 carbon atoms; $R_2$ is hydrogen or alkyl of 1 to 20 carbon atoms and X is the betaine polymer segment.

5. The SAM of claim 1 in which the betaine polymer segment is a copolymer of the betaine-containing monomer and an ethylenically unsaturated monomer selected from the class consisting of olefins, (meth)acryl monomers, and vinyl aromatic compounds.

6. A substrate having adhered directly or indirectly through an intermediate organometallic layer to a surface of the substrate a self-assembled monolayer (SAM) derived from an organophosphorus acid, wherein phosphorus acid groups of the organophosphorus acid are adsorbed on the substrate surface and organo groups of the organophosphorus acid extend outwardly from the substrate surface and at least one of the organo groups is substituted with a betaine polymer segment, and wherein the betaine polymer segment is derived from a betaine-containing monomer of the structure:

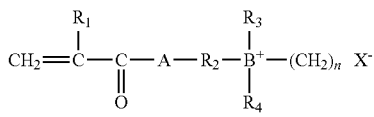

where $R_1$ is hydrogen or methyl; A is oxygen or —NH—; $R_2$ is ethylene or propylene; $R_3$ and $R_4$ are alkyl; and B is N or P; n is an integer of 1 to 4; and $X^-$ is $SO_3^-$ or $CO_2$.

7. The substrate of claim 6 wherein the substrate has functional groups on its surface selected from the group consisting of oxide and hydroxyl.

8. The substrate of claim 7 in which the phosphorus acid groups are reactive with the substrate surface to covalently bond the organophosphorus acid to the substrate surface.

9. The substrate of claim 6 in which the substrate is selected from the group consisting of metals, glass and polymers.

10. The substrate of claim 6 in which the SAM is adhered to the substrate surface through an organometallic layer.

11. The substrate of claim 10 in which the organometallic layer is a polymeric metal oxide.

12. The substrate of claim 11 in which the polymeric metal oxide contains alkoxide and hydroxyl ligands.

13. The substrate of claim 11 in which the polymeric metal oxide contains chloride ligands.

14. The substrate of claim 11 in which the metal of the polymeric metal oxide is selected from tantalum, titanium, zirconium, lanthanum, hafnium, niobium and tungsten.

15. The substrate of claim 6, wherein the betaine polymer segment is derived from [2-(methacryloyloxy)ethyl]dimethyl-(3-sulfopropyl)ammonium hydroxide.

16. The substrate of claim 15 wherein the substrate has functional groups on its surface selected from the group consisting of oxide and hydroxyl.

17. The substrate of claim 16 wherein the phosphorus acid groups are reactive with the substrate surface to covalently bond the organophosphorus acid to the substrate surface.

18. The substrate of claim 15 wherein the substrate is selected from the group consisting of metals, glass and polymers.

19. The substrate of claim 15 wherein the SAM is adhered to the substrate surface through an organometallic layer.

20. The substrate of claim 19 wherein the organometallic layer is a polymeric metal oxide.

21. The substrate of claim 20 wherein the polymeric metal oxide contains alkoxide and hydroxyl ligands.

22. The substrate of claim 20 wherein the polymeric metal oxide contains chloride ligands.

23. The substrate of claim 20 wherein the metal of the polymeric metal oxide is selected from tantalum, titanium, zirconium, lanthanum, hafnium, niobium and tungsten.

24. A self-assembled monolayer (SAM) derived from an organophosphorus acid and containing a betaine polymer segment, wherein at least one organo group of the organophosphorus acid is substituted with the betaine polymer segment, and wherein the betaine polymer segment is derived from [2-(methacryloyloxy)ethyl]dimethyl-(3-sulfopropyl)ammonium hydroxide.

25. The SAM of claim 24 wherein the organophosphorus acid is selected from the group consisting of organophosphoric acids, organophosphonic acids and organophosphinic acids.

26. The SAM of claim 24 wherein the organophosphorus acid is of one of the structures:

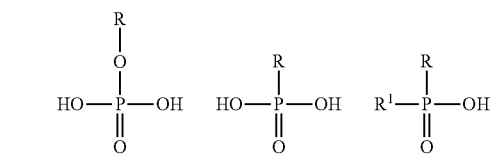

where R and $R^1$ are independently organic radicals that are aliphatic, aromatic or mixed aliphatic/aromatic; R and/or $R^1$ is substituted in a terminal position with the betaine polymer segment.

27. The SAM of claim 24 wherein the organophosphorus acid is of the structure:

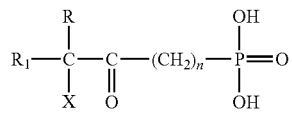

where n is an integer of 1 to 5; $R_1$ is an alkyl group of 1 to 20 carbon atoms; $R_2$ is hydrogen or alkyl of 1 to 20 carbon atoms and X is the betaine polymer segment.

28. The SAM of claim 24 in which the betaine polymer segment is a copolymer of the [2-(methacryloyloxy)ethyl]dimethyl-(3-sulfopropyl)ammonium hydroxide and an ethylenically unsaturated monomer selected from the class consisting of olefins, (meth)acryl monomers, and vinyl aromatic compounds.

* * * * *